United States Patent
Wall, Jr. et al.

(10) Patent No.: US 11,803,021 B2
(45) Date of Patent: Oct. 31, 2023

(54) OPTO-ELECTRONIC PACKAGE AND A METHOD FOR MAKING AN OPTO-ELECTRONIC PACKAGE

(71) Applicant: Infinera Corp., Annapolis Junction, MD (US)

(72) Inventors: Franklin Wall, Jr., North Little Rock, AR (US); John Osenbach, Kutztown, PA (US); Jiaming Zhang, Macungie, PA (US)

(73) Assignee: Infinera Corporation, San Jose, CA (US)

(*) Notice: Subject to any disclaimer, the term of this patent is extended or adjusted under 35 U.S.C. 154(b) by 0 days.

(21) Appl. No.: 17/215,728

(22) Filed: Mar. 29, 2021

(65) Prior Publication Data

US 2021/0302671 A1    Sep. 30, 2021

Related U.S. Application Data

(60) Provisional application No. 63/000,540, filed on Mar. 27, 2020.

(51) Int. Cl.
*G02B 6/42* (2006.01)

(52) U.S. Cl.
CPC ........... *G02B 6/426* (2013.01); *G02B 6/4251* (2013.01); *G02B 6/4267* (2013.01)

(58) Field of Classification Search
CPC ..... G02B 6/426; G02B 6/4251; G02B 6/4267
See application file for complete search history.

(56) References Cited

U.S. PATENT DOCUMENTS

| | | | |
|---|---|---|---|
| 7,667,324 B2 | 2/2010 | Wang et al. | |
| 9,612,409 B2 | 4/2017 | Finot et al. | |
| 2019/0341359 A1* | 11/2019 | Tang | ........................ H01L 24/95 |
| 2019/0391348 A1* | 12/2019 | Osenbach | ............ G02B 6/4246 |

\* cited by examiner

*Primary Examiner* — Sung H Pak
*Assistant Examiner* — Hoang Q Tran
(74) *Attorney, Agent, or Firm* — David L. Soltz

(57) ABSTRACT

Opto-electronic packages and methods for making opto-electronic packages are disclosed, including a method comprising forming an opto-electronic circuit on a first surface of a substrate of a lower package assembly, the first surface of the substrate having a first bonding pattern configured to provide a hermetic seal, the first bonding pattern extending around the opto-electronic circuit; positioning a bottom of a ring frame onto the first bonding pattern so as to surround the opto-electronic circuit with the ring frame; hermetically sealing a bottom of the ring frame to the first bonding pattern of the first surface of the substrate of the lower package assembly subsequent to the formation of the opto-electronic circuit on the first surface of the substrate; and hermetically sealing a top of the ring frame to form a hermetically sealed opto-electronic package.

20 Claims, 13 Drawing Sheets

OPTO-ELECTRONIC PACKAGE AND A METHOD FOR MAKING AN OPTO-ELECTRONIC PACKAGE

INCORPORATION BY REFERENCE

The present patent application claims priority to the provisional patent application identified by U.S. Ser. No. 63/000,540 filed on Mar. 27, 2020, the entire content of which is hereby incorporated herein by reference.

BACKGROUND

Optical transceiver modules or packages employed in telecommunications, fiber optic, and server applications typically contain active electronic devices such as semiconductor lasers that must be hermetically sealed within the package to protect the optical transceiver packages from variations in humidity, dust and other ambient conditions.

Traditionally, the optical transceiver packages are formed with an empty package having a base hermetically sealed to a ring frame to form an empty cavity having an open top configured to receive components to make an optical transceiver module. The components are added to the cavity from the open top of the ring frame and are secured to the base and an interior surface of the ring frame to form an opto-electronic circuit within the confines of the ring frame. After the opto-electronic circuit is formed, a cover is hermetically sealed to a top of the ring frame.

The base is made of a dielectric ceramic material having a top surface and a bottom surface. Conductive traces are applied to the top surface of the ceramic material for use in forming electrical connections between components. Conductive vias extend from the top surface to the bottom surface to provide external connections for electrical input and output. Electronic signals are routed into a space encompassed by the ring frame from outside of the ring frame and vice-versa by conductors embedded into the dielectric ceramic material of the base.

The ring frame is typically constructed of a dielectric material provided with an interior surface and an exterior surface. Conductive pads are applied to the interior surface of the ring frame for use in forming electrical connections between components within the ring frame, and external electrical connections. The ring frame was also provided with optical input and output ports for permitting optical signals to pass through the ring frame.

In constructing the prior art packages, all components are added from the top of the ring frame, all tooling and equipment must access components from the top of the ring frame, all test probing must come from the top of the ring frame, all visual inspection occurs from the top of the ring frame, rework is limited in scope based on component accessibility, and yield loss at any stage of assembly incorporates the costs of the base and the ring frame. Further, the width and length of the prior art packages had to include significant clearances to allow placement of the components from the top of the ring frame, thereby increasing the size of the ring frame relative to the size of the opto-electronic circuit.

Increased size of the ring frame is a significant drawback. For example, the prior art ring frame is normally soldered to the base to form the hermetic seal. As the size of the ring frame increases, the stress of the solder joint due to thermal expansion and contraction also increases. To ensure that the solder joint between the ring frame and the base does not fail, the prior art used hard solders to ensure a rigid solder joint. But, the use of larger dimensions and hard solders limits the types of materials that can be used to form the base and the ring frame, as such materials must have similar coefficients of thermal expansion. If the hard solder joints fail, gas and other materials may enter into the opto-electronic package and cause a failure of the opto-electronic circuit contained within the opto-electronic package.

There is a need in the art for a hermetically sealed opto-electronic package that permits the use of various materials for the base and ring frame having differing coefficients of thermal expansion while maintaining a stable hermetic seal. It is to such an improved opto-electronic package and a method for making an opto-electronic package that the present disclosure is directed.

SUMMARY

The problem of using hard solders to ensure a rigid solder joint between a ring frame and a base of an opto-electronic package that may cause failure of the joint is solved by opto-electronic packages and methods for making opto-electronics packages that may comprise forming an opto-electronic circuit on a first surface of a substrate of a lower package assembly, the first surface of the substrate having a first bonding pattern configured to provide a hermetic seal, the first bonding pattern extending around the opto-electronic circuit; positioning a bottom of a ring frame onto the first bonding pattern so as to surround the opto-electronic circuit with the ring frame; hermetically sealing a bottom of the ring frame to the first bonding pattern subsequent to the formation of the opto-electronic circuit on the first surface of the substrate; and hermetically sealing a top of the ring frame to form a hermetically sealed opto-electronic package; which reduces the size of the opto-electronic package, thereby reducing the stress and strain on joints of the opto-electronic package.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
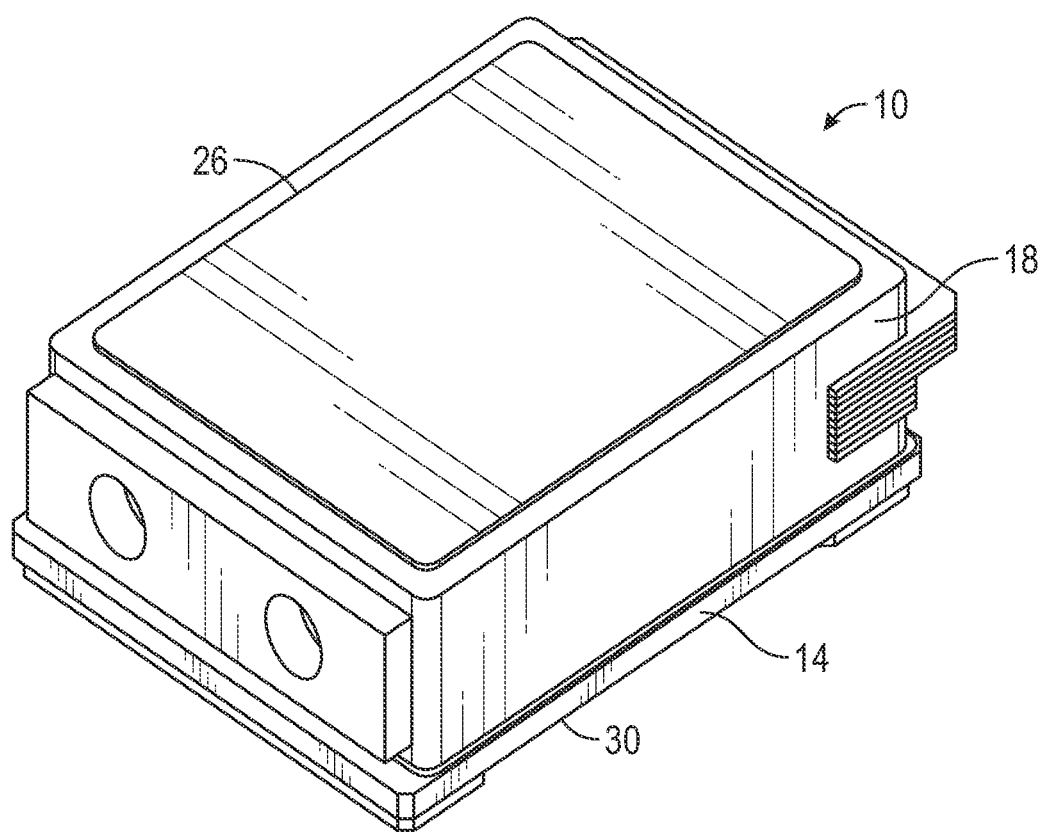
FIG. 1 is a top perspective view of an exemplary opto-electronic package constructed in accordance with the present disclosure, in which a ring frame is hermetically sealed to a lower package assembly after construction of the opto-electronic circuit on the lower package assembly in accordance with the present disclosure.

The mechanisms proposed in this disclosure circumvent the problems described above. The present disclosure describes opto-electronic packages and methods for making opto-electronic packages that result in lower stresses and strains in joints between components than previous methods, allowing for the use of component materials having different coefficients of thermal expansion and for the use of soft soldering the joints between the components. The mechanisms proposed in this disclosure also apply a ring frame to a lower package assembly after construction of the opto-electronic circuit on the lower package assembly thereby solving the problems discussed above related to constructing the opto-electronic circuit from the top of the ring frame.

In one aspect of the present disclosure, an exemplary method for making an opto-electronic package may comprise forming an opto-electronic circuit on a first surface of a substrate of a lower package assembly, the first surface of the substrate having a first bonding pattern configured to provide a hermetic seal, the first bonding pattern extending around the opto-electronic circuit; positioning a bottom of a ring frame onto the first bonding pattern so as to surround the opto-electronic circuit with the ring frame; hermetically sealing a bottom of the ring frame to the first bonding pattern subsequent to the formation of the opto-electronic circuit on the first surface of the substrate; and hermetically sealing a top of the ring frame to form a hermetically sealed opto-electronic package.

In one aspect of the present disclosure, an exemplary opto-electronic package may comprise a lower package assembly having a substrate with a first surface and a second surface opposed with respect to the first surface, the first surface having an opto-electronic circuit receiving region surrounded by a first bonding pattern, the substrate being constructed of a first material having a first coefficient of thermal expansion, the first coefficient of thermal expansion being indicative of an extent to which the first material expands upon heating; a ring frame surrounding the opto-electronic circuit receiving region, the ring frame having an interior surface defining a cavity bordered by the first surface, the ring frame constructed of a second material having a second coefficient of thermal expansion, the second coefficient of thermal expansion being indicative of an extent to which the second material expands upon heating, the first coefficient of thermal expansion and the second coefficient of thermal expansion differing in a range from 2 ppm to 30 ppm, the ring frame having a bottom and a top, the bottom having a second bonding pattern, the first and second bonding patterns connected with a first solder to form a first hermetic seal when molten solder is disposed therebetween, the ring frame having a third bonding pattern on the top; an opto-electronic circuit positioned within the void and connected to at least one of the first surface of the substrate and the interior surface of the ring frame; and a lid having constructed of a third material having a third coefficient of thermal expansion, the third coefficient of thermal expansion being indicative of an extent to which the third material expands upon heating, the lid having a fourth bonding pattern connected with a second solder to form a second hermetic seal. In some implementations, the first solder and/or the second solder are soft solder.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The term "trace" as used herein means a conductive path on at least one layer of a dielectric material that extends from a first location to a second location. The trace is composed of one or more conductive material.

Differential pairs have at least two substantially parallel traces and may include one or more ground common to both traces. The traces transmit information encoded within a signal utilizing differential signaling. Differential signaling is a method for electrically transmitting information using two complementary signals, e.g., a first signal S1 complements a second signal S2 such that S2=−S1. The differential signaling method sends the same electrical signal as a differential pair of signals, each in its own trace. Information transmitted utilizing differential signals is received by measuring the voltage between the differential pair. Because the differential signaling uses complementary signals, the traces of the differential pair are of the same length, and each trace is routed adjacent (parallel) to the other trace, the transmitted information is resistant to electromagnetic interference and other common-mode shift interferences. As used herein, the term "differential pair trace" means the set of traces in the differential pair.

The term "hermetic seal" refers to any type of sealing that makes an object airtight.

The coefficient of thermal expansion (CTE) is a material property that is indicative of the extent to which a material expands upon heating. CTE may be calculated by dividing the relative expansion (strain) of a material by the change in temperature.

Figure 2:
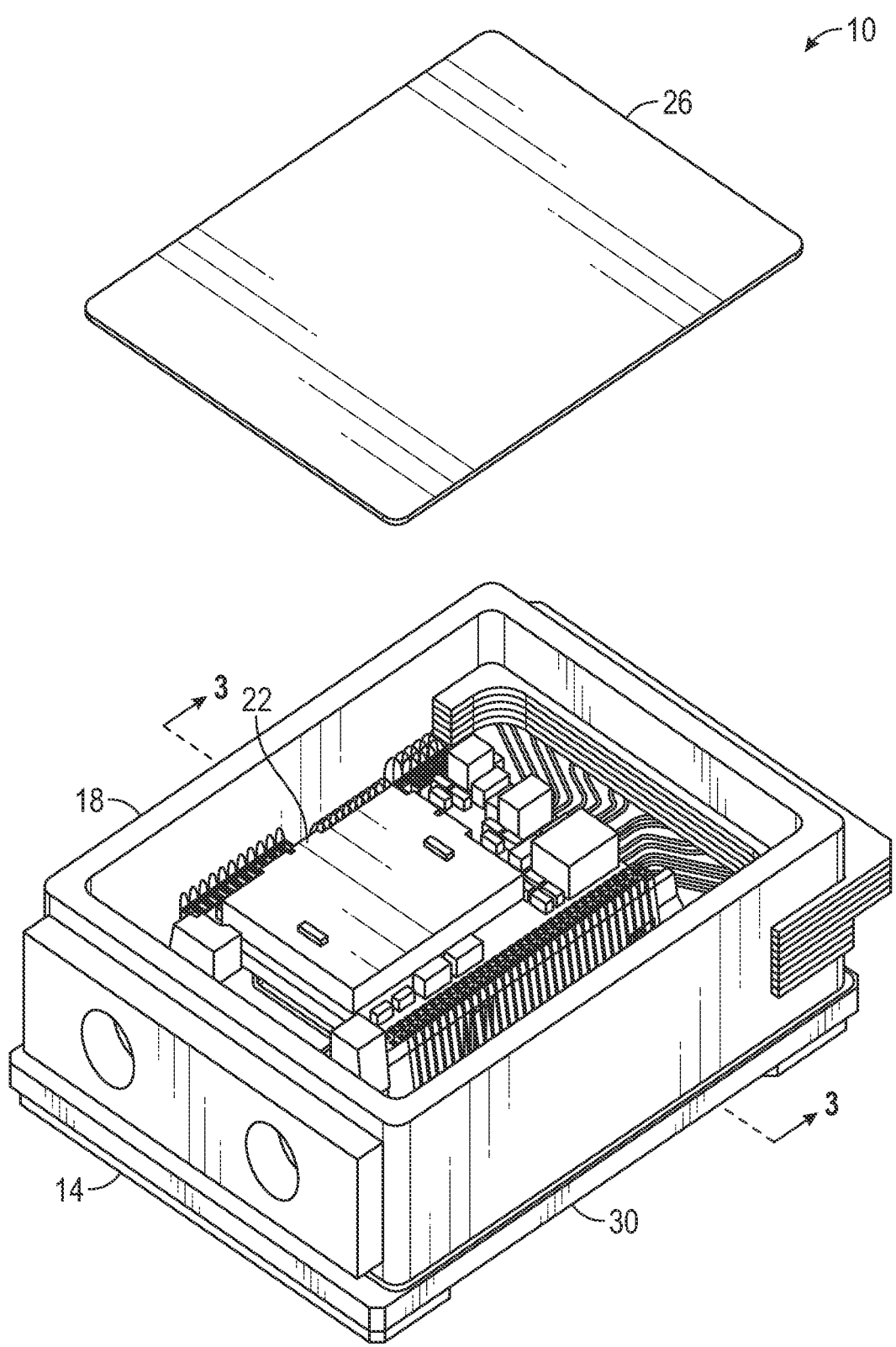
FIG. 2 is an exploded top perspective view of the exemplary opto-electronic package constructed in accordance with the present disclosure.

Referring now to the drawings, and in particular to FIGS. 1 and 2, shown therein and designated by a general reference numeral 10, is an opto-electronic package constructed in accordance with the present disclosure. The opto-electronic package 10 is provided with a lower package assembly 14, a ring frame 18, an opto-electronic circuit 22, and a lid 26.

Figure 3:
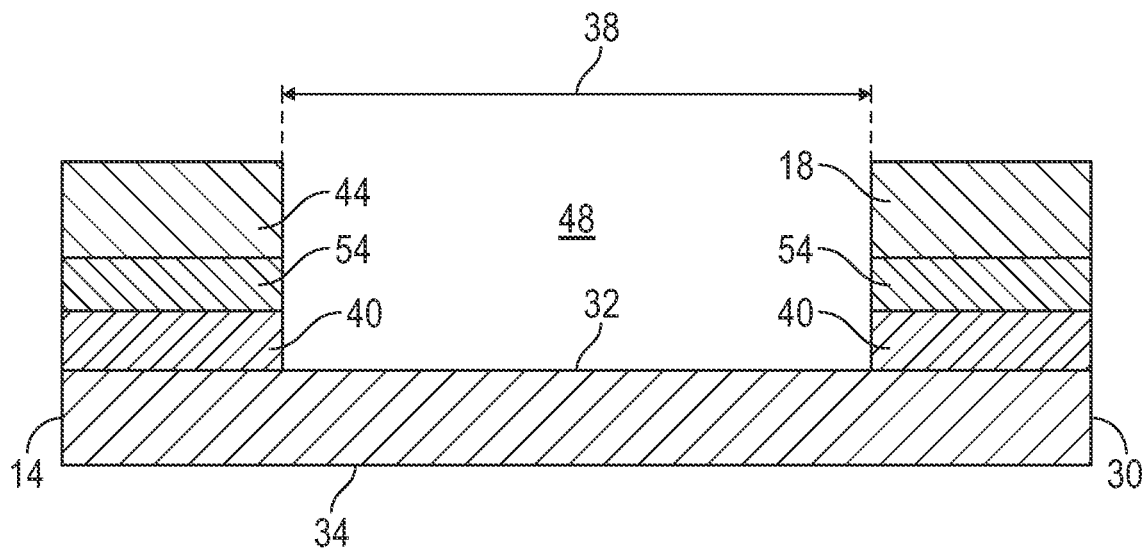
FIG. 3 is a partial cross-sectional, schematic view of a lower package assembly of the opto-electronic package taken along the lines 3-3 depicted in FIG. 2.
Figure 4:
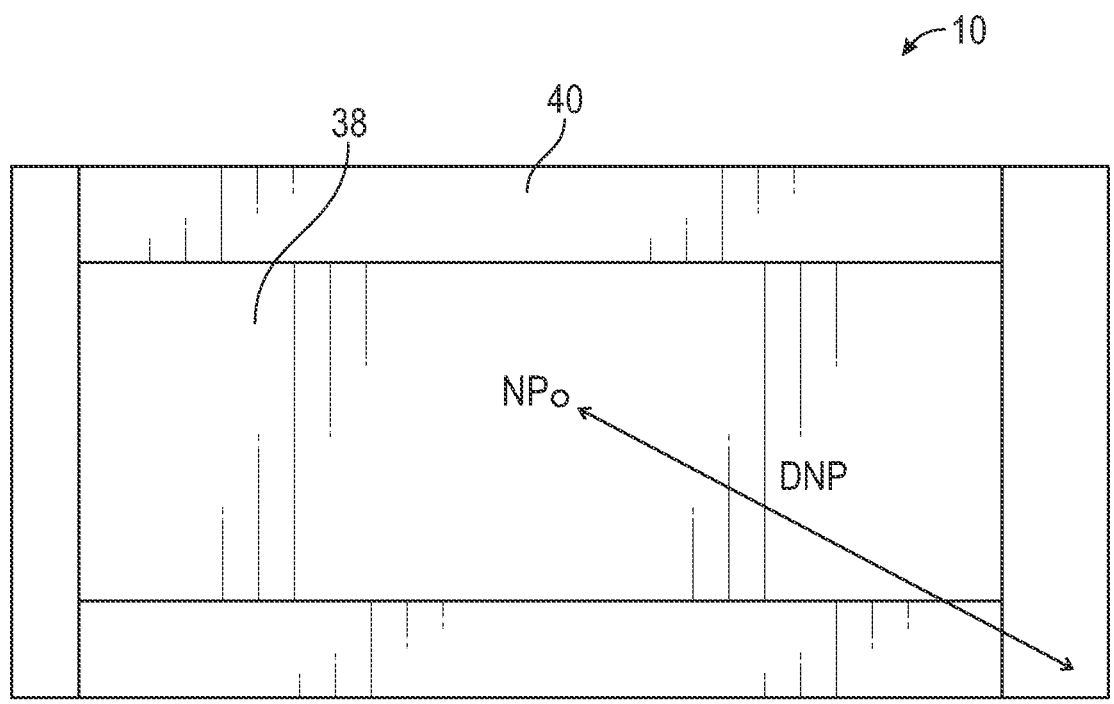
FIG. 4 is a top, schematic view of the opto-electronic package illustrating a distance from neutral point measurement utilized in the design of the opto-electronic package.

As illustrated in the schematic of FIG. 3, the opto-electronic package 10 has a neutral point (NP), which is a point or a portion of the opto-electronic package 10 having minimal material stresses, and a maximum stressed portion, which is a portion or point of the opto-electronic package 10 that has maximum material stresses in comparison to the material stresses elsewhere in the opto-electronic package 10. The maximum stressed portion may be located a maximum distance from the neutral point (NP) while still being in the opto-electronic package 10. That maximum distance from the neutral point may be referred to as the DNP.

Strain in the opto-electronic package 10 may be calculated with the following formula:

$$\text{Strain} = \Delta T \Delta \text{CTE} * \text{DNP}$$

where $\Delta T$ is the difference in temperature between where the opto-electronic package 10 was made (such as the solder melting point, epoxy cure point, weld, etc.) and the lowest temperature the opto-electronic package 10 is exposed to);

where $\Delta \text{CTE}$ is the difference in thermal expansion coefficient of the components being joined together, and where DNP (Distance from Neutral Point) is the largest distance from the center where the components are joined.

Stress the opto-electronic package 10 may be calculated with the following formula:

$$\text{Stress} = E\text{eff} * \text{Strain}$$

where Eeff is effective module which is essentially the spring constant of the material.

If stress and/or strain increase above a predetermined point, then the joint between the components (such as the connection between the lower package assembly 14 and a bottom 50 of the ring frame 18) may fail.

If a hard solder (for example, using AuSn, SAC, CuAg) is used to form a joint, the following maximum distances from the neutral point (DNP) and changes in CTE may apply:

DNP<approximately 15 mm, then $\Delta$CTE<approximately 10 ppm;

15 mm<DNP<25 mm, then $\Delta$CTE<approximately 5 ppm;

25 mm<DNP<50 mm, then $\Delta$CTE<approximately 2 ppm.

The term "ppm" refers to a change in dimension over a starting dimension. So, for example, if a part has a starting dimension of 10 mm long and a CTE of 10 ppm/° C., then going from a temperature of 100° C. to another temperature of 0° C., the part will change in dimensions by 10E-6/° C. (10 ppm/° C.)*10 mm*100° C.=10e-3 mm or 10 μm.

As applied to the opto-electronic package 10, using hard solders to join the components limits the types of materials that can be used to form the lower package assembly 14 and the ring frame 18, as such materials must have similar coefficients of thermal expansion (CTE). In order to allow use of a different material having a different coefficient of thermal expansion (CTE) to form the lower package assembly 14 than the material of the ring frame 18, soft soldering may be used, when the DNP or differences in the coefficient of thermal expansion is small enough to keep the stress and/or strain levels below the failure point of the soft-soldered joint.

If a soft solder is used to form a joint between the components, the following maximum distances from the neutral point (DNP) and changes in CTE may apply:
DNP<approximately 15 mm, then ΔCTE<approximately 30 ppm;
15 mm<DNP<25 mm, then ΔCTE<approximately 15 ppm;
25 mm<DNP<50 mm, then ΔCTE<approximately 10 ppm.

Soft soldering is defined as soldering at lower temperatures than hard soldering methods, normally using metal alloys that melt at temperatures typically less than 840 degrees Fahrenheit. Soft solders have the ability to have deformations between 35% and 70% elongation before a joint will fail, while joints constructed with a hard solder will fail at less than 35% elongation. Further, soft solders have a Young's modulus in a range from 1 Giga Pascal to 40 Giga Pascal. For example, the metals and/or metal alloys used for soft soldering may include one or more of In, InAg, and SnInAg.

In some implementations of the opto-electronic package 10, in which soft soldering is used, such as for the first solder between the bottom 50 of the ring frame 18 and the lower package assembly 14, the ring frame 18 encompasses the neutral point (NP) such that the ring frame 18 has the maximum stressed portion located the maximum distance from the neutral point (DNP).

In some implementations, the maximum stressed portion of the opto-electronic package may be located at the maximum distance (DNP), where the maximum distance may be in a range from 5 mm to 15 mm from the neutral point.

In some implementations, the maximum stressed portion of the opto-electronic package may be located at the maximum distance (DNP), where the maximum distance may be in a range from 15 mm to 25 mm from the neutral point, where the first coefficient of thermal expansion and the second coefficient of thermal expansion differ in a range from 2 ppm to 15 ppm, and where the first solder is a soft solder.

In some implementations, the maximum stressed portion of the opto-electronic package 10 may be located at the maximum distance (DNP), where the maximum distance being in a range from 25 mm to 50 mm from the neutral point, wherein the first coefficient of thermal expansion and the second coefficient of thermal expansion differing in a range from 2 ppm to 10 ppm, and wherein the first solder is a soft solder.

Figure 6:
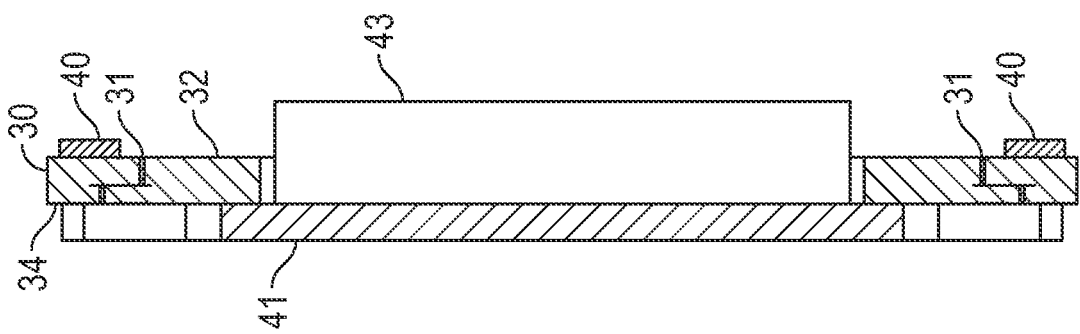
FIG. 6 is a cross-sectional view of the exemplary lower package assembly of FIG. 5 taken along the lines 6-6 depicted in FIG. 5.
Figure 5:
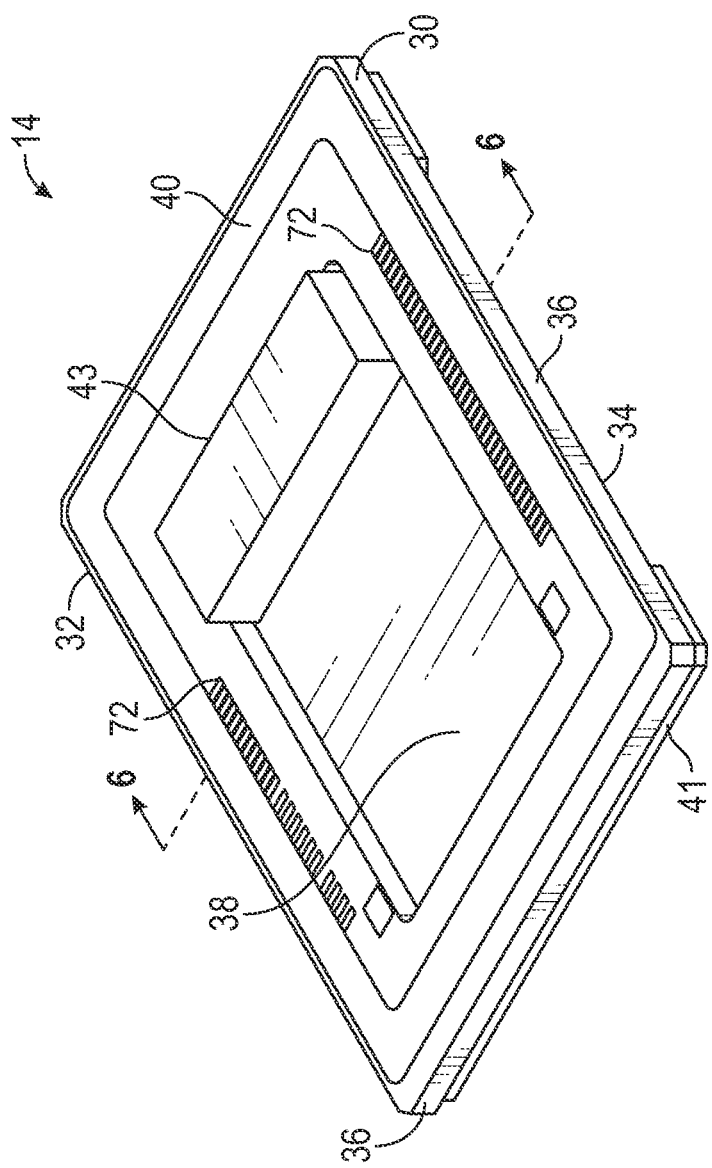
FIG. 5 is a top perspective view of an exemplary lower package assembly of the opto-electronic package constructed in accordance with the present disclosure.

Returning now to the components of the opto-electronic package 10, as shown in FIGS. 3, 5, 6, the lower package assembly 14 has a substrate 30 with a first surface 32 and a second surface 34 opposed with respect to the first surface 32. The first surface 32 may have one or more sides 36. The first surface 32 may have an opto-electronic circuit receiving region 38 surrounded by a first bonding pattern 40. In some implementations, the first bonding pattern 40 is a continuous loop. The first bonding pattern 40 may be a continuous strip surrounding the opto-electronic circuit receiving region 38. The first bonding pattern 40 may be proximate to the one or more sides 36 of the first surface 32 of the substrate 30. The bonding patterns described herein, such as the first bonding pattern 40, may be formed by the substrate being a bondable or solderable material, or a bondable or solderable material applied to the substrate. The first bonding pattern may be formed of metal (e.g., copper, gold, or a copper or gold-plated material), glass, or ceramic. In some embodiments, the first bonding pattern is a metallized pattern constructed of a solderable metal, such as copper, gold, or a copper-plated or gold-plated material.

The substrate 30 may be a conductive material with glass feed throughs, or a dielectric material with conductive vias 31, or combinations thereof. The substrate 30 is constructed of a first material having a first coefficient of thermal expansion. The first coefficient of thermal expansion is indicative of an extent to which the first material expands upon heating. The first material can be conductive, non-conductive, or a combination of conductive and non-conductive materials.

Exemplary conductive materials include metal, such as nickel-cobalt ferrous alloys, for example, the material known as Kovar™ manufactured by CRS Holdings, Inc., Delaware, (having a CTE of approximately 5-7 ppm/° C.). Exemplary conductive materials further include metal, such as one or more of NiFe (having a CTE of approximately 8-12 ppm/° C.); Iron (having a CTE of approximately 10-15 ppm/° C.); AlSiC (having a CTE of approximately 6-8 ppm/° C.); CuW (having a CTE of approximately 4.5-12 ppm/° C.); and Cu (having a CTE of approximately 17 ppm/° C.).

Exemplary non-conductive materials include ceramics and/or glass. Exemplary ceramic materials include Al2O3 (having a CTE of approximately 3-14 ppm/° C., depending upon composition and process); AlN (having a CTE of approximately 4.5-5 ppm/° C.); BN (having a CTE of approximately 3-4 ppm/° C.); SiC (having a CTE of approximately 2.5-4 ppm/° C.). Glass has a CTE of approximately 1-15 ppm/° C.

Figure 16:
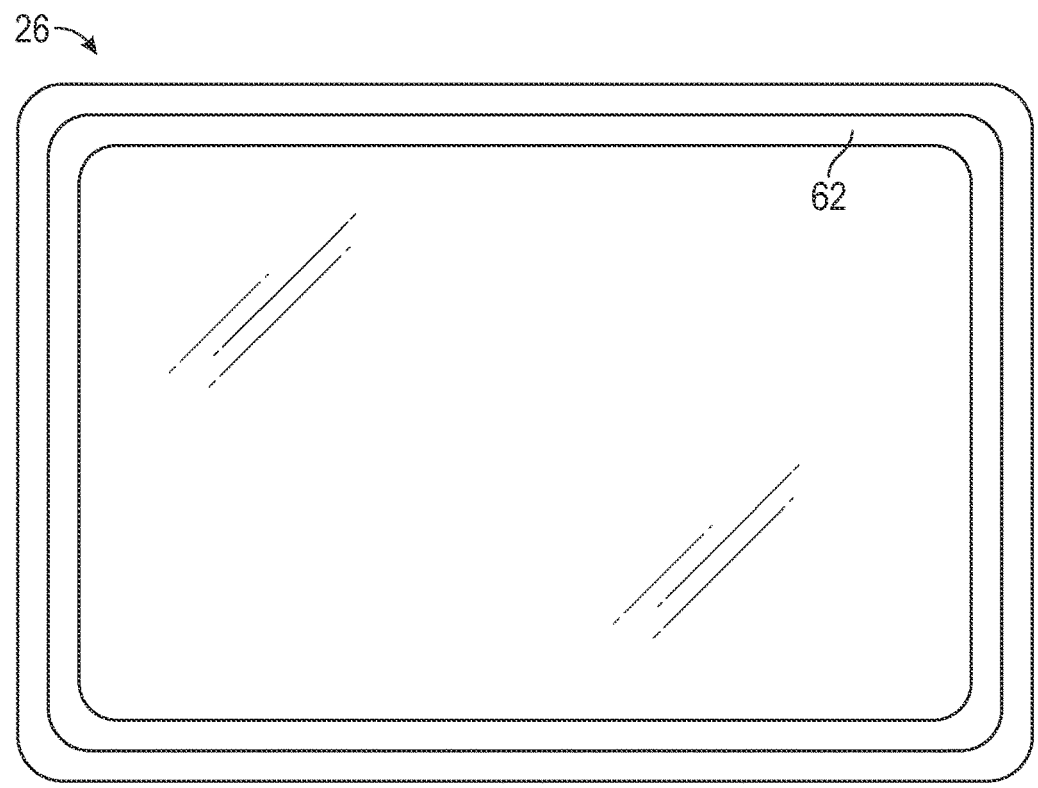
FIG. 16 is a bottom view of an exemplary lid in accordance with the present disclosure.

The lower package assembly 14 may have one or more electrical input/output internal connections 72. The lower package assembly 14 may have one or more electrical input/output external connections 74 (FIG. 16).

Figure 17:
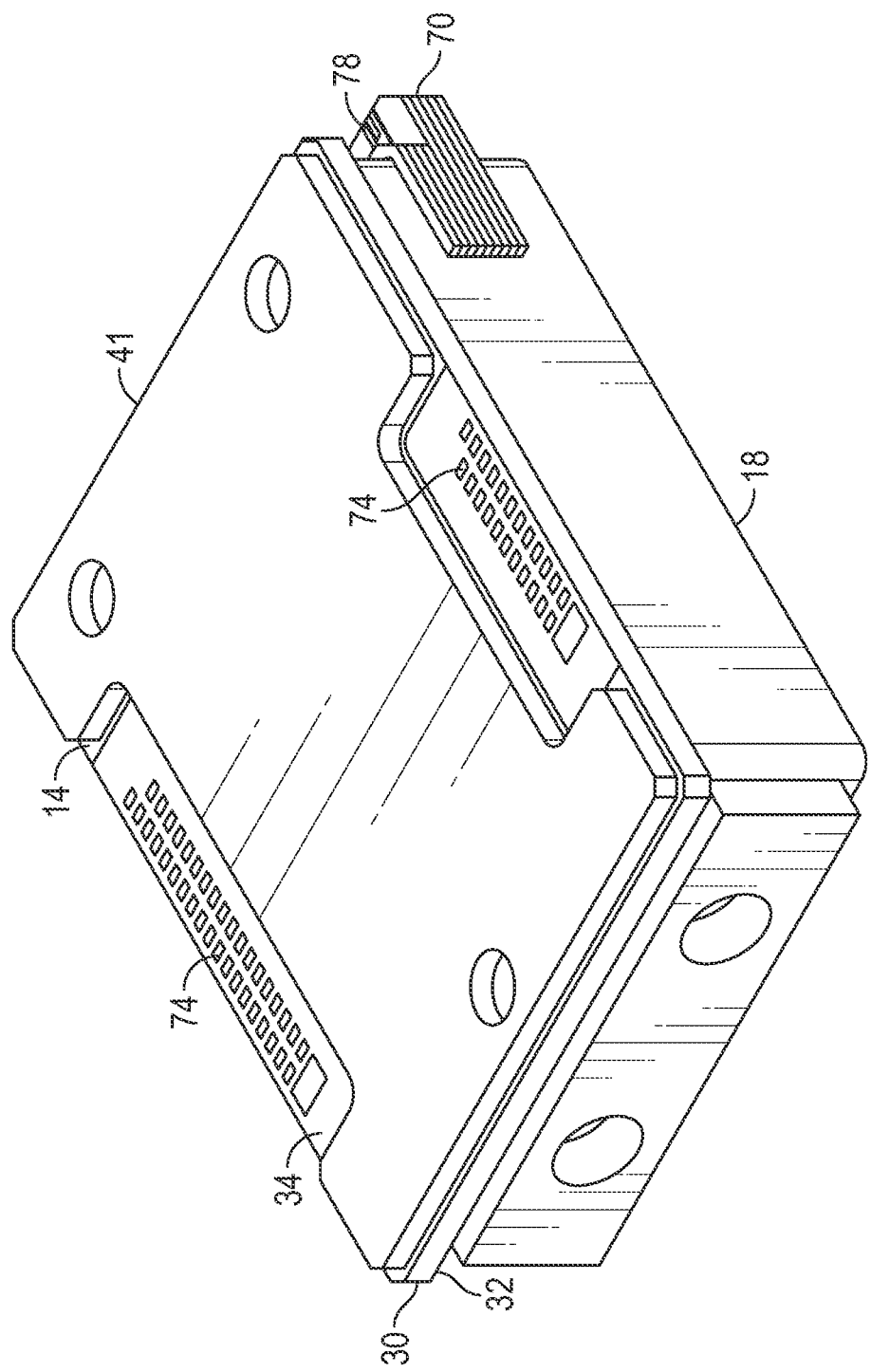
FIG. 17 is a bottom perspective view of the exemplary lower package assembly with the ring frame.

As shown in FIGS. 5 and 17, in some implementations, the lower package assembly 14 may have a base 41. The base 41 may be attached to the second surface 34 of the substrate 30. In some implementations, the base may be formed, at least in part, of a copper tungsten alloy (CuW).

In some implementations, the lower package assembly 14 may have a pedestal 43. The pedestal 43 may be within or form part of the opto-electronic circuit receiving region 38. In some implementations, the pedestal 43 may be formed, at least in part of, a copper tungsten alloy (CuW).

Turning now to FIGS. 2 and 3, after the opto-electronic circuit 22 is connected to the lower package assembly 14, the ring frame 18 is attached to the lower package assembly 14 such that the ring frame 18 surrounds the opto-electronic circuit receiving region 38. The ring frame 18 has an exterior surface 42 and an interior surface 44. The interior surface 44 defines a cavity 48. When the ring frame 18 is attached to the lower package assembly 14, the cavity 48 is bordered by the first surface 32 of the lower package assembly 14. The ring frame 18 is constructed of a second material having a second coefficient of thermal expansion. The second coefficient of thermal expansion is indicative of an extent to which the second material expands upon heating. The first coefficient of thermal expansion and the second coefficient of thermal expansion differ in a range from 0 ppm (the same material) to approximately 30 ppm.

Figure 15:
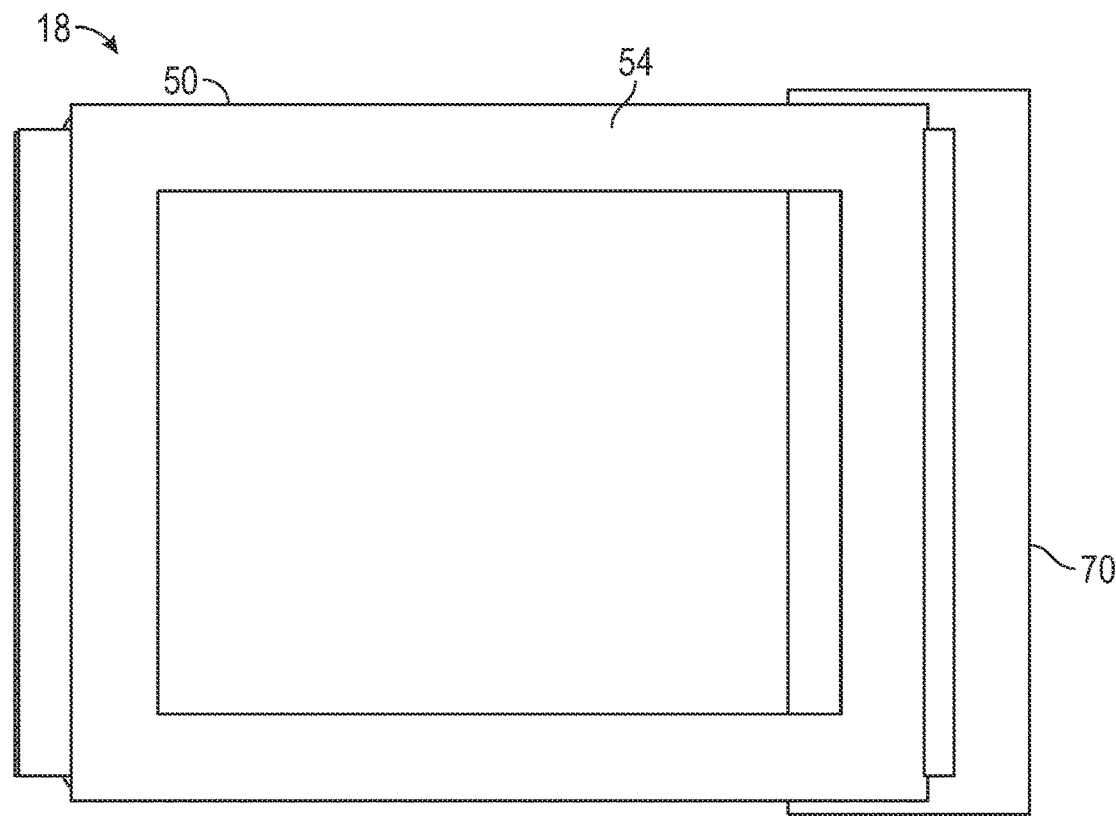
FIG. 15 is a bottom view of the exemplary ring frame of FIG. 13.

As shown in FIGS. 3 and 13-15, the ring frame 18 has a bottom 50 and a top 52. In some implementations, the ring frame 18 is constructed of a solderable material. As illustrated in FIG. 15, optionally, in some implementations the bottom 50 may have a second bonding pattern 54. The second bonding pattern 54 may be a continuous loop and/or strip extending around the cavity 48 when the ring frame 18 is attached to the lower package assembly 14. The shape of the second bonding pattern 54 may be configured to match a shape of the first bonding pattern 40. The shape of the second bonding pattern 54 may be configured such that, when assembled, the second bonding pattern 54 may be in contact with the first bonding pattern 40. The second bonding pattern 54 may be constructed in a similar manner as the first bonding pattern 40 discussed above.

The bottom 50 of the ring frame 18 and/or the second bonding pattern 54 is connected with the first bonding pattern 40 of the lower package assembly 14 with a first bonding material, such as solder (when molten solder is disposed therebetween), to form a first hermetic seal between the bottom 50 of the ring frame 18 and the first surface 32 of the lower package assembly 14. The first solder may be a soft solder or a hard solder. The first bonding material may be solder or glass depending upon the material used to construct the first bonding pattern 40 and the ring frame 18 and/or the second bonding pattern 54. The first hermetic seal can be a metal-to-metal joint, a glass-to-metal joint, a glass-to-glass joint, or a glass-to-ceramic joint, for example.

Figure 13:
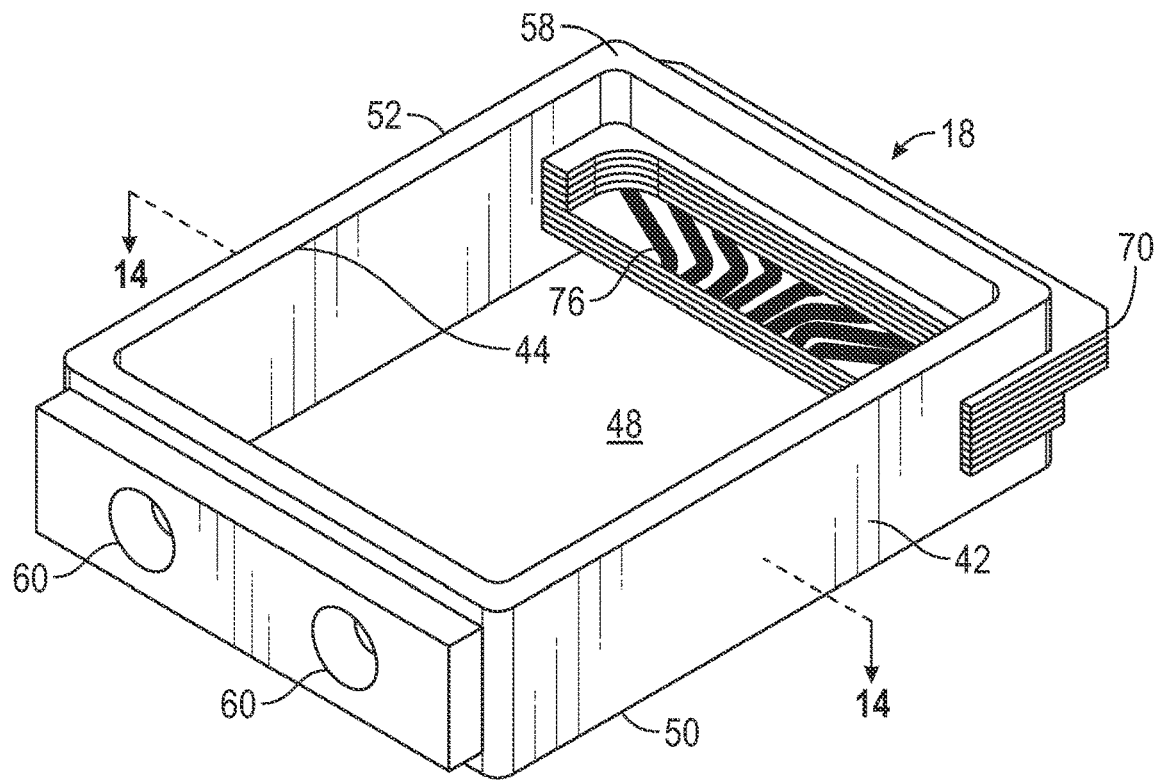
FIG. 13 is a top perspective view of an exemplary ring frame constructed in accordance with the present disclosure.
Figure 14:
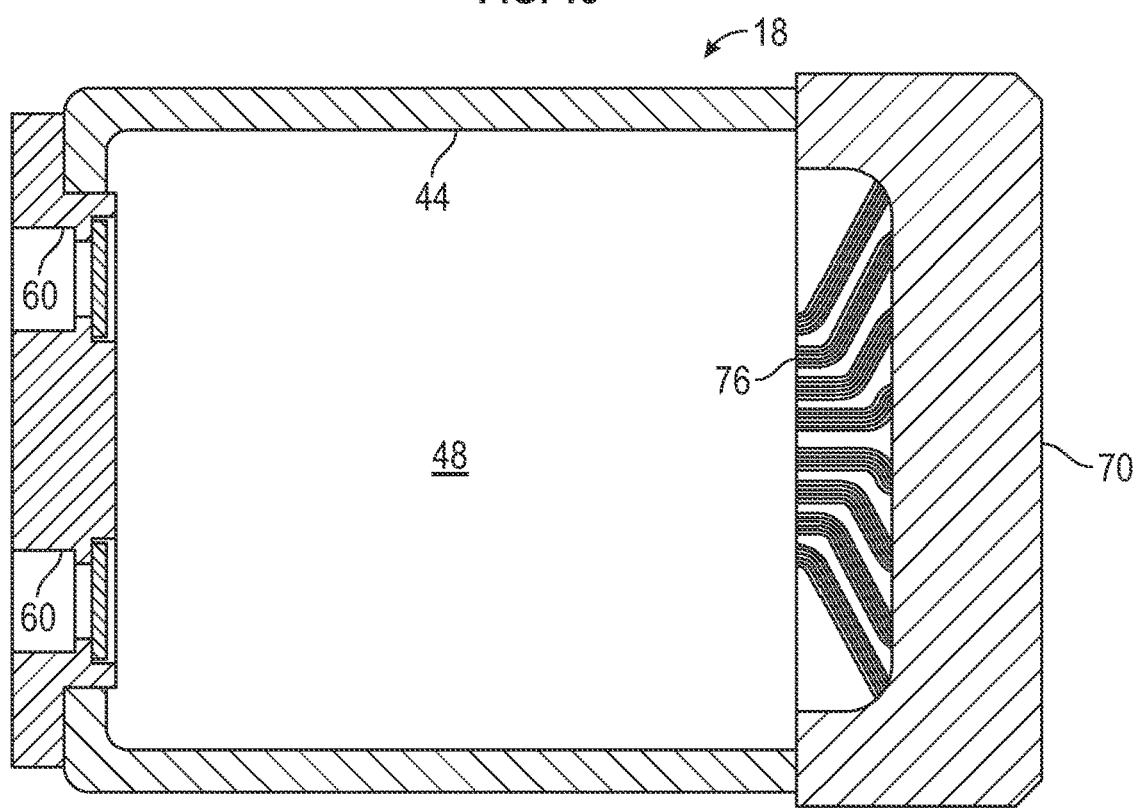
FIG. 14 is a cross-sectional view of the exemplary ring frame of FIG. 13 taken along the lines 14-14 depicted in FIG. 13.

In some implementations, the ring frame 18 may have a third bonding pattern 58 on the top 52 (FIG. 13). The third bonding pattern 58 may be a continuous loop and/or strip around the cavity 48 when the ring frame 18 is attached to the lower package assembly 14. The third bonding pattern 58 can be constructed similar to the first bonding pattern 40.

The ring frame 18 may have one or more optical ports 60 extending between and through the exterior surface 42 and the interior surface 44. In one implementation, the ring frame 18 may have two optical ports 60. The one or more optical ports 60 may be configured to pass optical signals from the interior surface 44 to the exterior surface 42 of the ring frame 18 and/or configured to pass optical signals from the exterior surface 42 to an interior surface 44 of the ring frame 18. The one or more optical ports 60 may be adapted to receive at least one of an optical fiber and an optical connector.

The ring frame 18 may have one or more heat dissipation components, such as one or more heat fins 70. The heat fins 70 may extend from the interior surface 44 to the exterior surface 42 of the ring frame 18 and be configured to transfer heat out of the opto-electronic package 10. The ring frame 18 may have one or more electrical input/output internal connections 76. The ring frame 18 may have one or more electrical input/output external connections 78.

Figure 7:
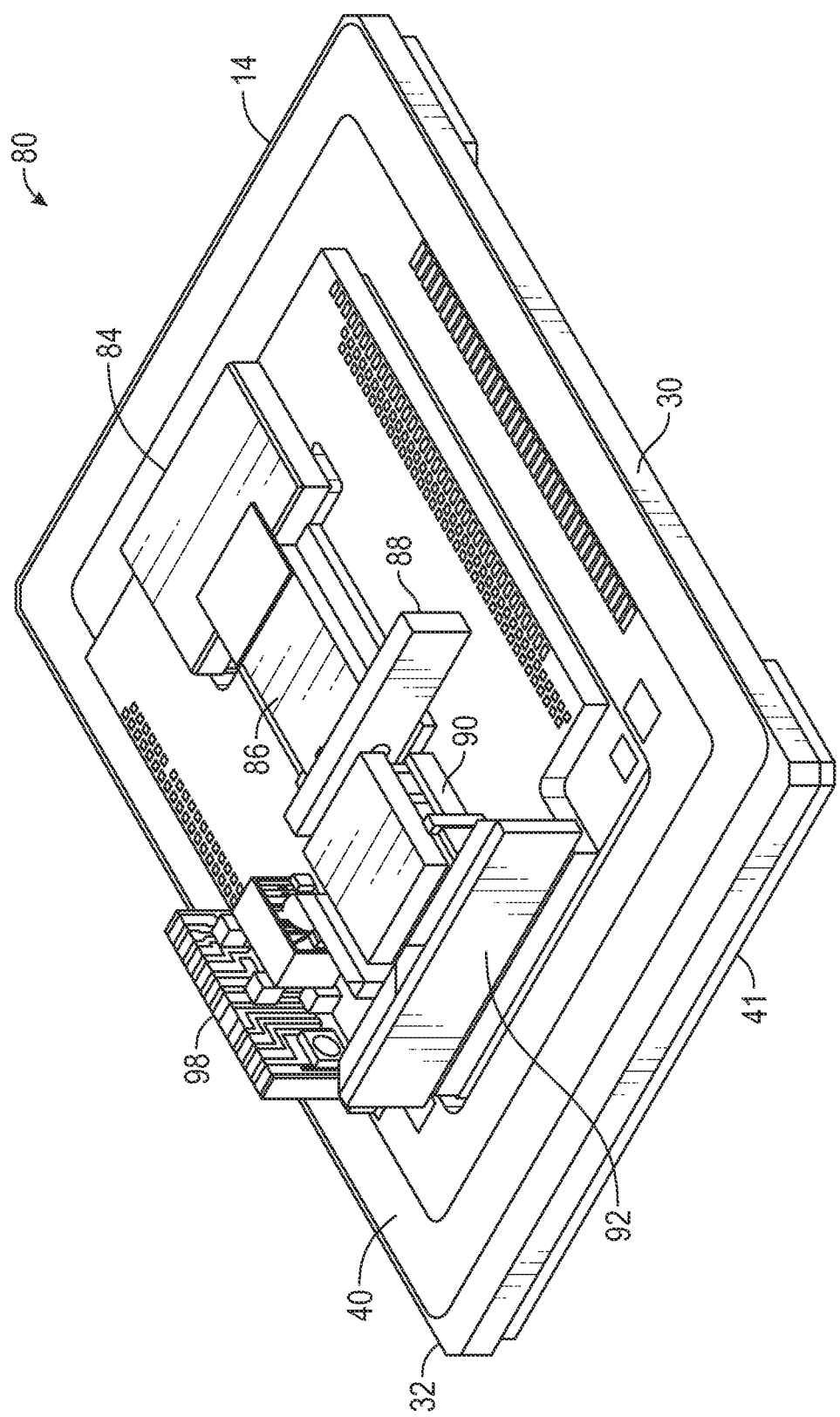
FIG. 7 is a top perspective view of a partial opto-electronic circuit constructed on the lower package assembly of the opto-electronic package prior to hermetically sealing a ring frame to the lower package assembly in accordance with the present disclosure.
Figure 8:
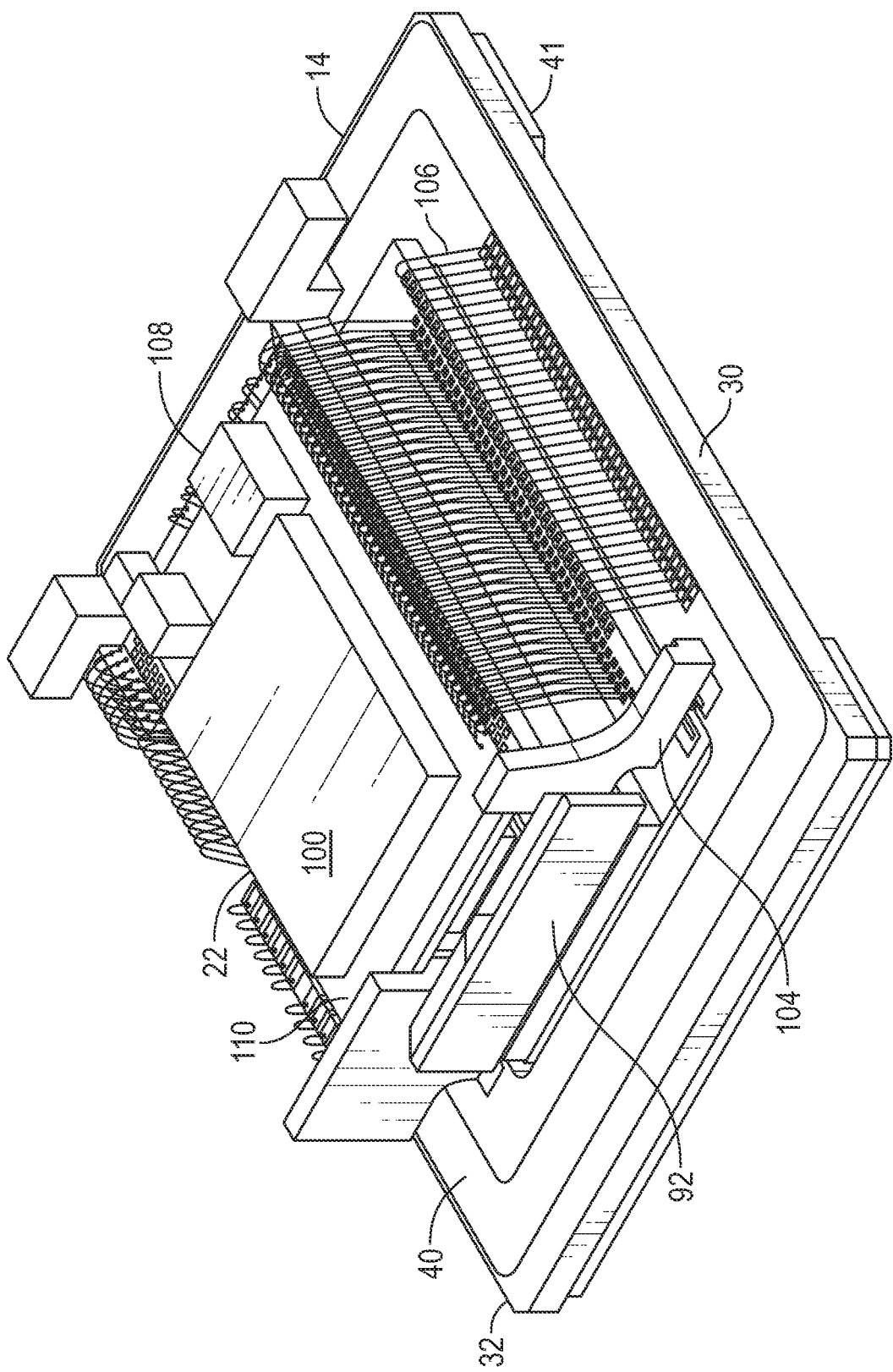
FIG. 8 is a top perspective view of an opto-electronic circuit constructed on the lower package assembly of the opto-electronic package prior to hermetically sealing a ring frame to the lower package assembly in accordance with the present disclosure.

Turning now to FIGS. 7 and 8, the opto-electronic circuit 22 is positioned within the opto-electronic circuit receiving region 38 and may be connected to the first surface 32 of the substrate 30 of the lower package assembly 14. When the ring frame 18 is in place, the opto-electronic circuit 22 is within the cavity 48 and may be connected to the interior surface 44 of the ring frame 18.

Turning now to FIG. 16, the lid 26 is constructed of a third material having a third coefficient of thermal expansion. The third coefficient of thermal expansion is indicative of an extent to which the third material expands upon heating. The third material may be the same or different than the first material and/or the second material. The third material may be a solderable or weldable material.

As illustrated in FIG. 16, in some implementations, the lid 26 may optionally have a fourth bonding pattern 62 on the bottom of the lid 26. The fourth bonding pattern 62 may be a continuous loop and/or strip. The fourth bonding pattern 62 can be constructed in a similar manner as the first bonding pattern 40, discussed above. The shape of the fourth bonding pattern 62 of the lid 26 may be configured to match a shape of the third bonding pattern 58 of the ring frame 18. The shape of the fourth bonding pattern 62 may be configured such that, when assembled, the fourth bonding pattern 62 may be in contact with the third bonding pattern 58.

The lid 26 may be connected to the top 52 of the ring frame 18 (and/or the fourth bonding pattern 62 may be connected to the third bonding pattern 58 on the ring frame 18) with a second bonding material to form a second hermetic seal between the lid 26 and the ring frame 18. The second bonding material may be a soft solder, a hard solder, or glass. The second hermetic seal can be constructed in a similar manner as the first hermetic seal described above. The lid 26 may be constructed of the same or different material as the ring frame 18 so long as the coefficients of thermal expansion are within the ranges discussed above to prevent failure of the second hermetic seal.

Figure 9:
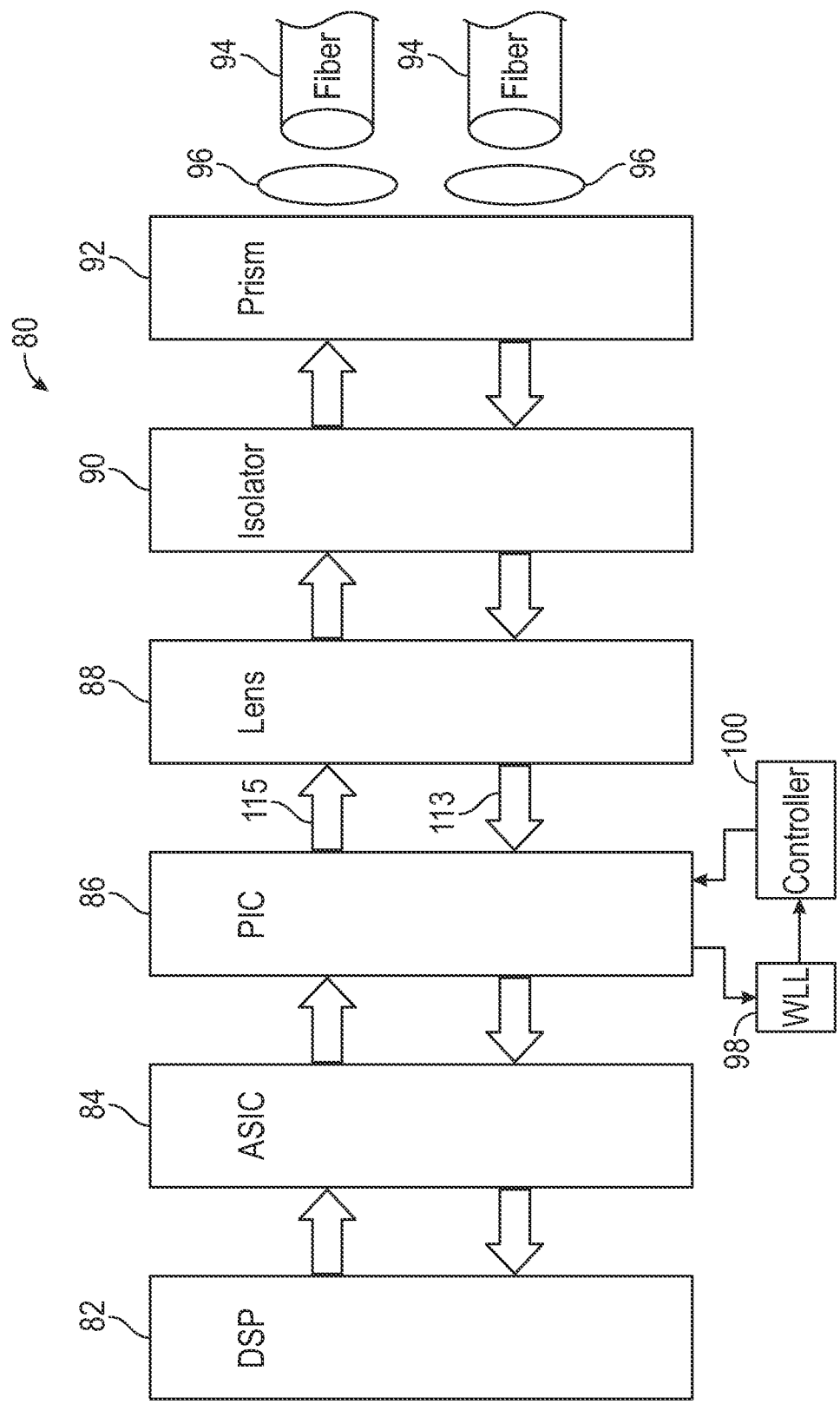
FIG. 9 is a schematic diagram of an optics and laser assembly of the opto-electronic circuit of FIG. 8.

As illustrated in FIGS. 7 and 9, in some implementations, the opto-electronic circuit 22 includes at least one optic and laser assembly 80 configured to generate optical signals. The optic and laser assembly 80 may comprise one or more of: a digital signal processor (DSP) 82, an application specific integrated circuit (ASIC) 84, a photonic integrated circuit (PIC) 86, a lens 88, an isolator 90, and a prism 92. The optic and laser assembly 80 may be configured to connect to one or more fiber 94, such as optical fiber and/or electrical fiber. The optic and laser assembly 80 may further comprise one or more assembly port 96 for receiving the fiber 94. In some implementations, the PIC 86 may be connectable to a wavelength locker (WLL) circuit 98 and/or a controller circuit 100.

The controller circuit 100 may be implemented in hardware on a printed circuit board, for example, using inductors, resistors, capacitors, etc. Optionally, in one example, the controller circuit 100 may be implemented to include a microprocessor. As used herein, the term microprocessor may include any computer or processor-based or microprocessor-based system including systems using microcontrollers, reduced instruction set computers (RISC), application specific integrated circuits (ASICs), programmable gate array (PGA), field programmable gate array (FPGAs), logic circuits, and any other circuit or processor capable of executing the functions described herein.

As shown in FIG. 8, the controller circuit 100 may be part of a controller assembly 102 mounted in conjunction with the optics and laser assembly 80. In some implementations, the controller assembly 102 may be connected to the lower package assembly 14 subsequent to the connection of the optics and laser assembly 80. The controller assembly 102 may further comprise one or more of: a support frame 104, wire bonds 106, supporting discretes 108, and a controller substrate 110.

Figure 10:
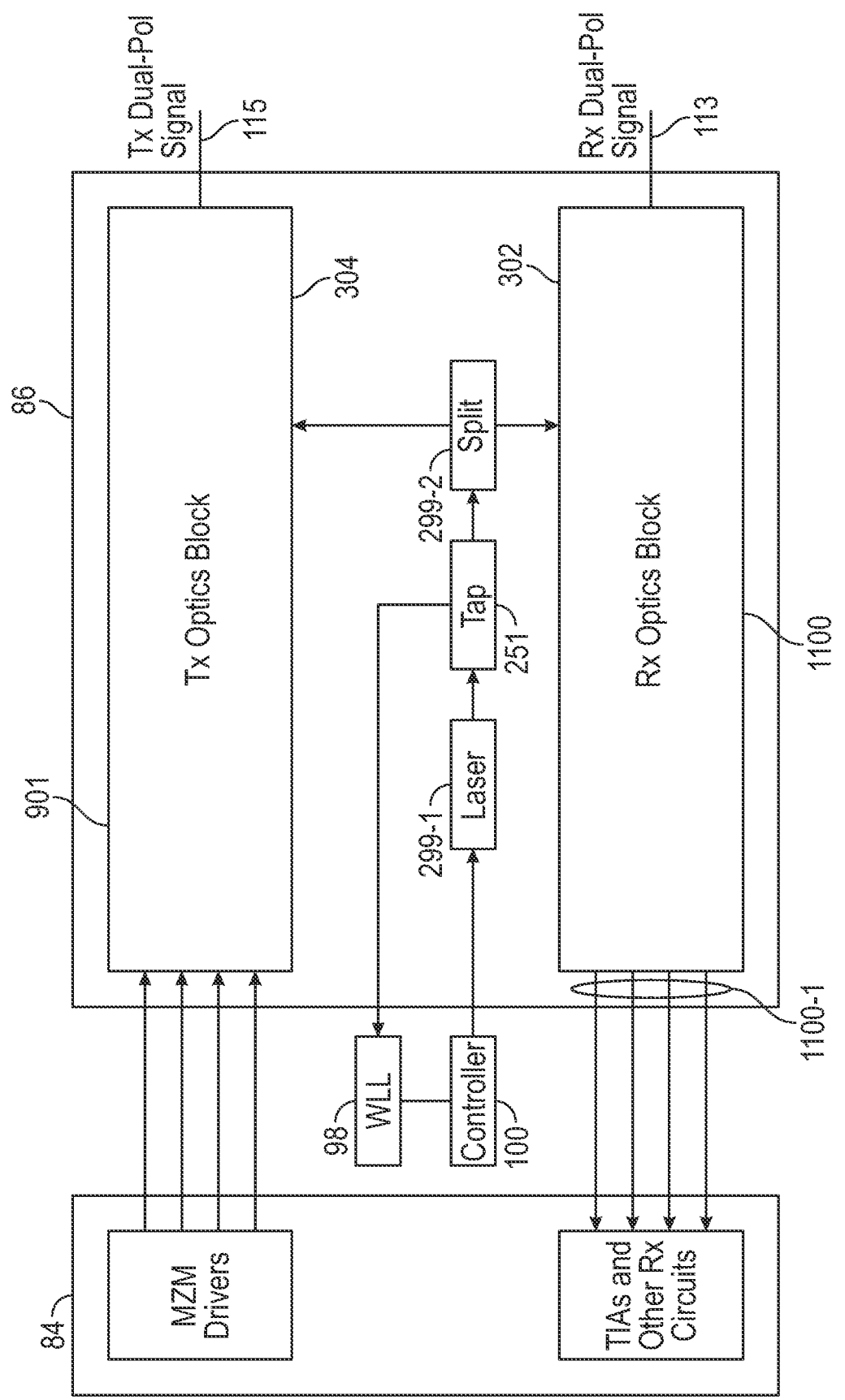
FIG. 10 is a block diagram of the opto-electronic circuit of FIG. 8.

FIG. 10 illustrates an exemplary one of the photonic integrated circuit (PIC) 86. In some implementations, the PIC 86 may include a receiver 302, a laser 299-1, an optical tap 251, a splitter 299-2, and a transmitter 304.

The transmitter 304 is configured to transmit signals. The transmitter 304 includes a Tx D/A and Optics Block 901.

Figure 11:
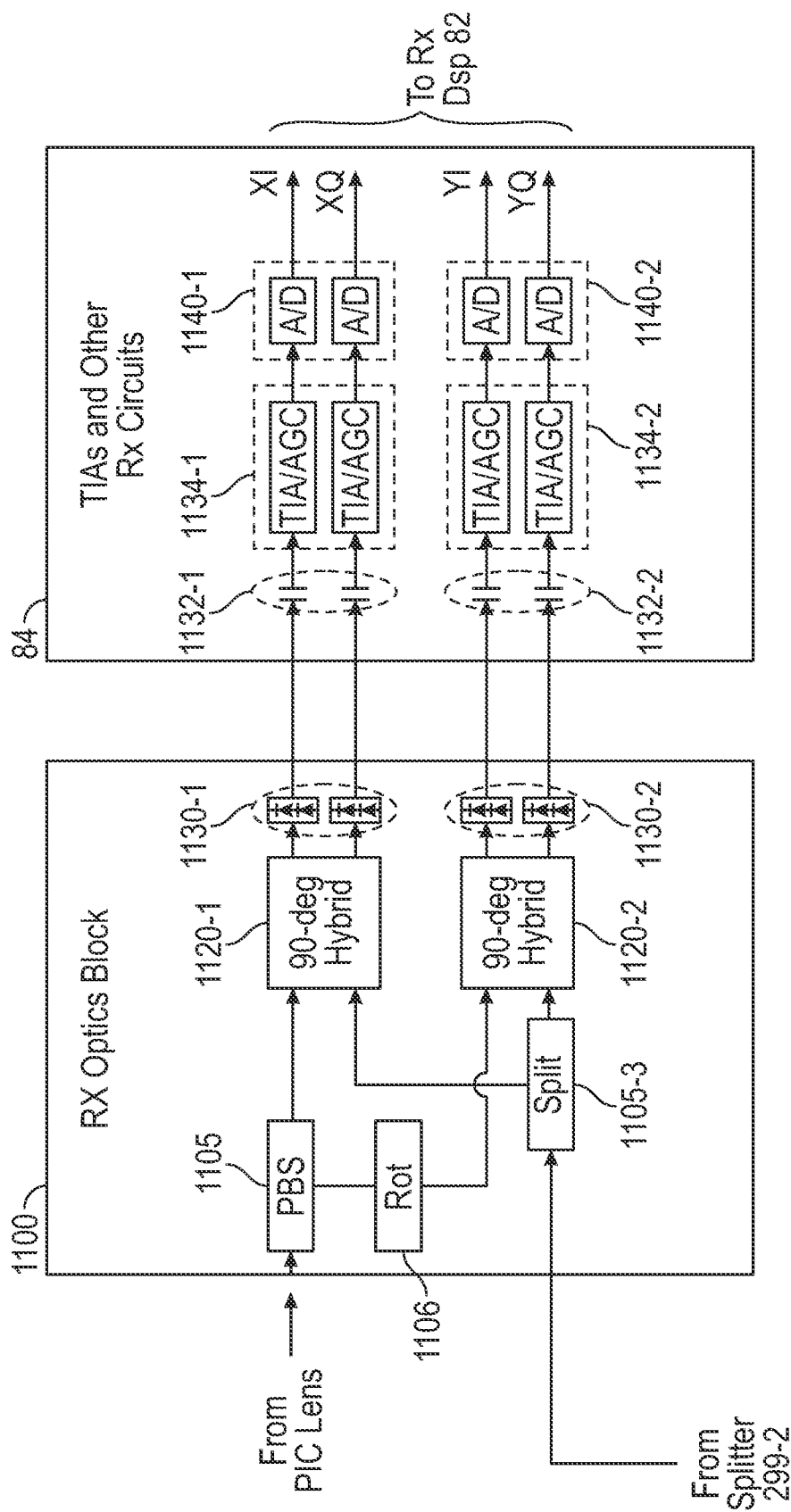
FIG. 11 is a block diagram of a partial receiver portion of the opto-electronic circuit of FIG. 8.

The receiver 302 is configured to receive one or more optical subcarriers, such as optical subcarriers SC0 to SC19. In particular, as shown in FIG. 11, the receiver 302 includes an Rx A/D and Optics Block 1100 which is coupled or connected to an optical communication path 113 to receive one or more optical subcarriers noted above. Based on the received optical subcarriers, the Rx A/D and Optics Block 1100 outputs one or more electrical signals 1100-1 to the receiver digital signal processor (Rx DSP) 82. Based on electrical signals 1100-1, the Rx DSP 82 outputs client data D-1' to D-n' associated with information carried by the one more optical subcarriers input to and processed by the PIC 86.

The laser 299-1 supplies an optical signal to the optical tap 251, which in turn, provides a portion of the signal, for example, 10% of the power of the input optical signal, to the wavelength locking circuit 98, including for example, an etalon. The remaining optical signal output from tap 251 is supplied to the splitter 299-2.

The splitter 299-2 supplies a first portion of the received light from the tap 251 to the Tx D/A and Optics Block 901 and a second portion of the received light from the tap 251, as a local oscillator signal, to the Rx A/D and Optics Block 1100. The Rx A/D and Optics Block 1100 outputs electrical signals 1100-1 to a receiver digital signal processor (Rx DSP) based on the input local oscillator signal from splitter 299-2 as well as subcarriers input to the Rx A/D and Optics Block 1100 from optical communication path or fiber 113.

Based on electrical signals 1100-1, the Rx DSP 82 outputs data streams D-1' to D-n', each of which being associated with or corresponding to information carried by a respective one of optical subcarriers. It is noted, however, that, in one example, the number of data streams D-1' to D-n' is less than a number of optical subcarriers input to the Rx A/D and Optics block 1100.

The Rx DSP 82 also may output a first signal 1150-1, for example, a first electrical signal, indicative of the frequency of one or more of the optical subcarriers to a circuit, such as the controller circuit 100. In addition, in one example, the controller circuit 100 receives a second signal, for example, a second electrical signal, from wavelength locker (WLL) circuit 98 indicative of the frequency of light output from tap 251 to the WLL circuit 98. The WLL circuit 98 may be provided within, or external to, the controller circuit 100. In a further example, the WLL 98 may provide an electrical signal to a frequency adjusting circuit. The controller circuit 100, in one example, outputs a control signal to a frequency adjusting circuit, which may be operatively coupled to the laser 299-1 to control the frequency of light output therefrom.

As shown in FIG. 11, the Rx A/D and Optics Block 1100, in conjunction with the Rx DSP 82, may carry out coherent detection in the receiver 302. The Rx A/D and Optics Block 1100 may include one or more of: a polarization splitter (PBS) 1105 with first and second outputs, a local oscillator (LO) laser, 90-degree optical hybrids or mixers 1120-1 and 1120-2 (referred to generally as hybrid mixers 1120 and individually as hybrid mixer 1120), detectors 1130-1 and 1130-2 (referred to generally as detectors 1130 and individually as detector 1130, each including either a single photodiode or balanced photodiode), AC coupling capacitors 1132-1 and 1132-2, transimpedance amplifiers/automatic gain control circuits TIA/AGC 1134-1 and 1134-2, ADCs 1140-1 and 1140-2 (referred to generally as ADCs 1140 and individually as ADC 1140).

The polarization beam splitter (PBS) 1105 may include a polarization splitter that receives an input polarization multiplexed optical signal including optical subcarriers, such as SC0 to SC19, via the optical communication path 113. The optical communication path 113 includes, for example, an optical fiber segment. The PBS 1105 may split the incoming optical signal into the two X and Y orthogonal polarization components. The Y component may be supplied to a polarization rotator 1106 that rotates the polarization of the Y component to have the X polarization. Hybrid mixers or 90-degree optical hybrid circuits 1120 may combine the X and rotated Y polarization components with light from local oscillator laser 1110, which, in one example, is a tunable laser. For example, hybrid mixer 1120-1 may combine a first polarization signal (e.g., the component of the incoming optical signal having a first or X (TE) polarization output from a first PBS port with light from a local oscillator), and hybrid mixer 1120-2 may combine the rotated polarization signal (e.g., the component of the incoming optical signal having a second or Y (TM) polarization output from a second PBS port) with the light from the local oscillator. In one example, a polarization rotator may be provided at the output of the PBS 1105 to rotate Y component polarization to have the X polarization.

The detectors 1130 may detect mixing products output from the optical hybrids, to form corresponding voltage signals, which are subject to AC coupling by capacitors 1132-1 and 1132-1, as well as amplification and gain control by TIA/AGCs 1134-1 and 1134-2. The outputs of TIA/AGCs 1134-1 and 1134-2 and ADCs 1140 may convert the voltage signals to digital samples. For example, two detectors 1130-1 (e.g., photodiodes) may detect the X polarization signals to form the corresponding voltage signals, and a corresponding two ADCs 1140-1 may convert the voltage signals to digital samples (XI, XQ) for the first polarization signals after amplification, gain control and AC coupling. Similarly, two detectors 1130-2 may detect the rotated Y polarization signals to form the corresponding voltage signals, and a corresponding two ADCs 1140-2 may convert the voltage signals to digital samples (YI, YQ) for the second polarization signals after amplification, gain control and AC coupling. The RX DSP 82 may process the digital samples associated with the X and Y polarization components to output data associated with one or more subcarriers within a group of subcarriers SC0 to SC19 encompassed by the bandwidth (one of bandwidths BWj, BWk, BWl, and BWm) associated with the secondary node housing the particular Rx DSP 1150.

While FIG. 11 shows the Rx A/D and Optics Block 1100, and/or the ASIC 84, as including a particular number and arrangement of components, in some implementations, the optical receiver 302 may include additional components, fewer components, different components, or differently arranged components. The number of detectors 1130 and/or ADCs 1140 may be selected to implement an optical receiver 302 that is capable of receiving a polarization multiplexed signal. In some instances, one of the components illustrated in the other figures may carry out a function described herein as being carry out by another one of the components illustrated in FIG. 11.

Figure 12:
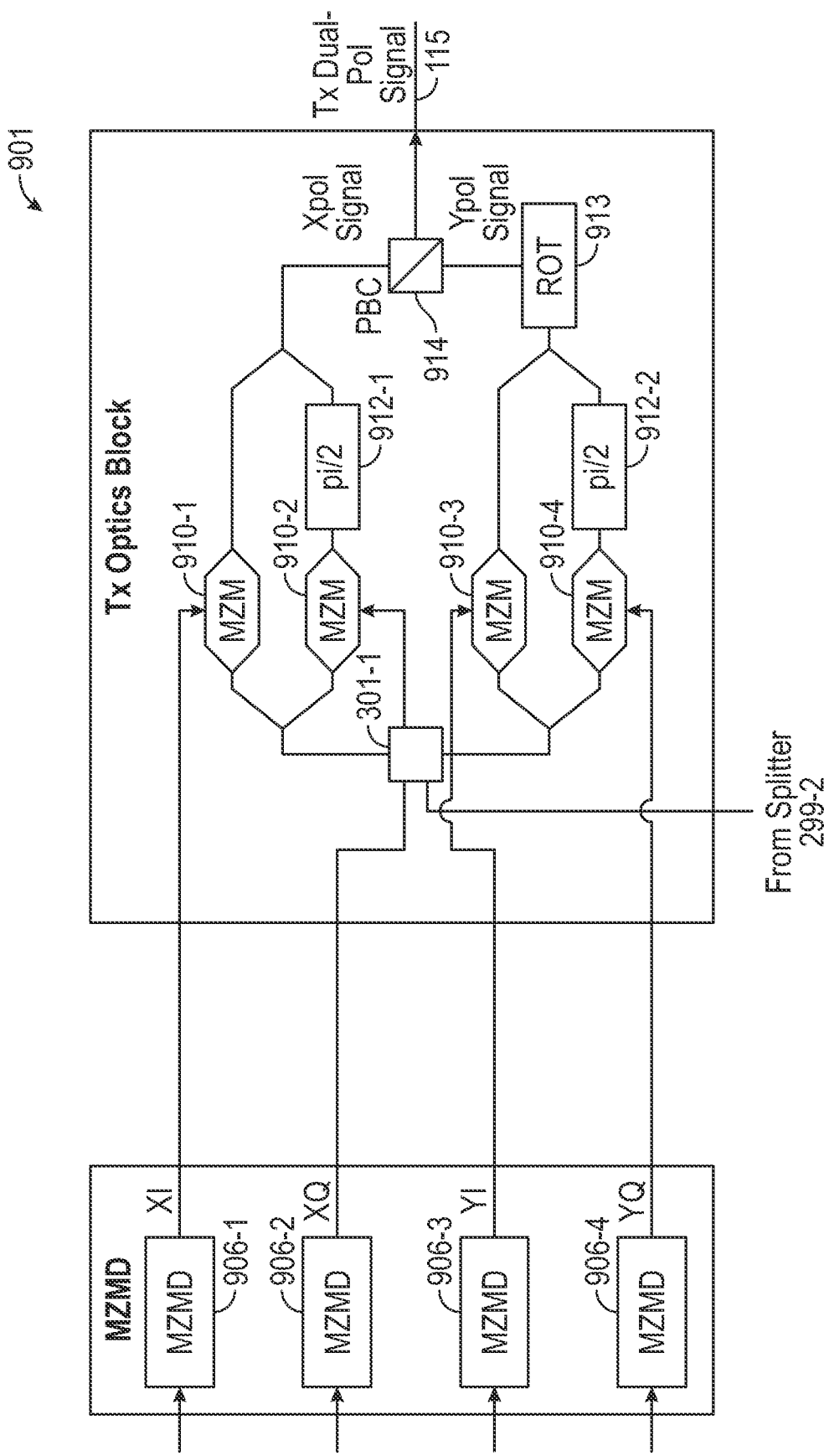
FIG. 12 is a block diagram of a partial transmitter portion of the opto-electronic circuit of FIG. 8.

FIG. 12 illustrates the Tx D/A and Optics Block 901, which may include driver circuits 906-1 to 906-2, modulators 910-1 to 910-4, phase shifters 912-1 to 912-2, a polarization rotator (ROT) 913, a splitter 301-1, and a polarization beam combiner (PBC) 914. While FIG. 12 shows the Tx D/A and Optics Block 901 as including a particular number and arrangement of components, in some implementations, the Tx D/A and Optics Block 901 may include additional components, fewer components, different components, or differently arranged components.

The driver circuits 906-1 to 906-2 receive the analog signals from DACs and adjust the voltages or other characteristics thereof to provide drive signals to a corresponding one of the modulators 910-1 to 910-4.

One or more of the modulators 910-1 to 910-4 may be, for example, a Mach-Zehnder modulator (MZM) that modulates the phase and/or amplitude of the light output from the laser. As used herein, a "modulator" may refer to each modulator, such as MZMs 910-1 to 910-4, individually, or refer to such modulators collectively. For example, MZMs 910-1 to 910-4 may collectively be referred to as a "nested" Mach-Zehnder modulator.

A portion of light from laser 299-1 output from splitter 299-2 is provided to the splitter 301-1, which further splits the light, such that a first part of portion of the light supplied from the splitter 301-1 is supplied to a first MZM pairing, including a first and second MZMs 910-1 and 910-2, and a second part of the light supplied from the splitter 301-1 is supplied to a second MZM pairing, including a third and fourth MZMs 910-3 and 910-4.

The first portion of the light supplied from the splitter 301-1 may be split further into third and fourth portions, such that the third portion is modulated by MZM 910-1 to provide an in-phase (I) component of an X (or TE) polarization component of a modulated optical signal, and the fourth portion is modulated by MZM 910-2 and fed to phase shifter 912-1 to shift the phase of such light by 90 degrees in order to provide a quadrature (Q) component of the X polarization component of the modulated optical signal. Similarly, the second portion of the light supplied from the splitter 301-1 may be further split into fifth and sixth portions, such that the fifth portion is modulated by MZM 910-3 to provide an I component of a Y (or TM) polarization component of the modulated optical signal, and the sixth portion is modulated by MZM 910-4 and fed to phase shifter 912-2 to shift the phase of such light by 90 degrees to provide a Q component of the Y polarization component of the modulated optical signal.

The optical outputs of the first and second MZMs 910-1 and 910-2 are combined to provide an X polarized optical signal including I and Q components and are fed to the polarization beam combiner (PBC) 914, which, in one example, is provided in the Tx D/A and Optics Block 901. In addition, the outputs of the third and fourth MZMs 910-3 and 910-4 are combined to provide an optical signal that is fed to polarization rotator 913, that rotates the polarization of such optical signal to provide a modulated optical signal having a Y (or TM) polarization. The Y polarized modulated optical signal also is provided to the PBC 914, which combines the X and Y polarized modulated optical signals to provide a polarization multiplexed ("dual-pol") modulated optical signal, including one or more subcarriers, onto an optical fiber, for example, which may be included as a segment of optical fiber in optical communication path 115.

An exemplary method of manufacturing the opto-electronic package 10 will now be described. In a first step, the opto-electronic circuit 22 may be formed on the first surface 32 of the substrate 30 of the lower package assembly 14. For example, the opto-electronic circuit 22 may be assembled or attached to the opto-electronic circuit receiving region 38 surrounded by the first bonding pattern 40. In a second step, the bottom 50 of the ring frame 18 may be positioned onto the first bonding pattern 40 of the substrate 30 of the lower package assembly 14, so as to surround the opto-electronic circuit 22 with the ring frame 18. In a third step, the bottom 50 of the ring frame 18 may be hermetically sealed to the lower package assembly 14, subsequent to the formation of the opto-electronic circuit 22 on the first surface 32 of the substrate 30. In a fourth step, the top 52 of the ring frame 18 may be hermetically sealed to form the hermetically sealed opto-electronic package 10.

In some implementations, the third step may further comprise hermetically sealing the bottom 50 of the ring frame 18 to the lower package assembly 14, by hermetically sealing the second bonding pattern 54 of the ring frame 18 with the first bonding pattern 40 of the first surface 32 of the substrate 30 of the lower package assembly 14. Hermetically sealing may comprise soldering the bottom 50 of the ring frame 18 (and/or the second bonding pattern 54) and the first bonding pattern 40 using soft soldering and/or glass bonding.

In some implementations, the fourth step may further comprise hermetically sealing the top 52 of the ring frame 18 by hermetically sealing the lid 26 to the top 52 of the ring frame 18. In some implementations, hermetically sealing may comprise soft soldering and/or glass bonding. In some implementations, the lid 26 may have the fourth bonding pattern 62 and/or the top 52 of the ring frame 18 may have the third bonding pattern 58, and hermetically sealing the lid 26 to the top 52 may comprise connecting the fourth bonding pattern 62 and the third bonding pattern 58 using soft soldering and/or glass bonding.

In some implementations, two or more ring frames 18 and lids 26 may be hermetically sealed to a single lower package assembly 14. For example, the first surface 32 of the substrate 30 may have a first and a second opto-electronic circuit receiving region 38, each surrounded by one of the first bonding pattern 40, a first opto-electronic circuit 22 configured to act as a receiver may be positioned in the first opto-electronic circuit receiving region 38 and a second opto-electronic circuit 22 configured to act as a transmitter positioned in the second opto-electronic circuit receiving region 38, each surrounded by and sealed within the cavity 48 of a first and second ring frame 18, and each sealed with a first one and a second one of the lid 26.

CONCLUSION

Conventionally, the size, material, and method of construction of opto-electronic packages have been limited by placement of the components from the top of the ring frame. In accordance with the present disclosure, opto-electronic packages may be formed by forming an opto-electronic circuit on a first surface of a substrate of a lower package assembly, the first surface of the substrate having a first bonding pattern configured to provide a hermetic seal, the first bonding pattern extending around the opto-electronic circuit; positioning a bottom of a ring frame onto the first bonding pattern so as to surround the opto-electronic circuit with the ring frame; hermetically sealing a bottom of the ring frame to the first bonding pattern subsequent to the formation of the opto-electronic circuit on the first surface of the substrate; and hermetically sealing a top of the ring frame to form a hermetically sealed opto-electronic package; thereby decreasing minimum sizes of the package, decreasing stresses and strains, and thereby allowing the use of different types of materials for the components of the package.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

Even though particular combinations of features are recited in the claims and/or disclosed in the specification, these combinations are not intended to limit the disclosure.

In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment.

What is claimed is:

1. An opto-electronic package, comprising:
   a lower package assembly having a substrate with a first surface and a second surface opposed with respect to the first surface, the first surface having an opto-electronic circuit receiving region surrounded by a first bonding pattern, the substrate being constructed of a first material having a first coefficient of thermal expansion, the first coefficient of thermal expansion being indicative of an extent to which the first material expands upon heating;
   a ring frame surrounding the opto-electronic circuit receiving region, the ring frame having an interior surface defining a cavity bordered by the first surface, the ring frame constructed of a second material having a second coefficient of thermal expansion, the second coefficient of thermal expansion being indicative of an extent to which the second material expands upon heating, the first coefficient of thermal expansion and the second coefficient of thermal expansion differing in a range from 2 ppm to 30 ppm, the ring frame having a bottom and a top, the bottom having a second bonding pattern, the first and second bonding patterns connected to form a first hermetic seal, the ring frame having a third bonding pattern on the top;
   an opto-electronic circuit positioned within the cavity and connected to at least one of the first surface of the substrate and the interior surface of the ring frame, wherein the ring frame encompasses the opto-electronic receiving region and the opto-electronic circuit; and
   a lid having constructed of a third material having a third coefficient of thermal expansion, the third coefficient of thermal expansion being indicative of an extent to which the third material expands upon heating, the lid having a fourth bonding pattern connected to the third bonding pattern to form a second hermetic seal, such that each of the first and second bonding patterns encompass the opto-electronic circuit.

2. The opto-electronic package of claim 1, wherein the ring frame includes an exterior surface, and wherein the opto-electronic circuit includes at least one laser configured to generate optical signals, and wherein the ring frame includes an optical port configured to pass at least a portion of the optical signals from the interior surface to the exterior surface of the ring frame.

3. The opto-electronics package of claim 1, wherein the ring frame includes an exterior surface, and wherein the opto-electronic circuit includes at least one photodiode configured to convert optical signals into electrical signals, and wherein the ring frame includes an optical port configured to pass at least a portion of the optical signals from an exterior surface of the ring frame and to an interior surface of the ring frame.

4. The opto-electronic package of claim 3, wherein the optical port is adapted to receive at least one of an optical fiber or an optical connector.

5. The opto-electronic package of claim 1, wherein the ring frame encompasses a neutral point of the opto-electronic package, the ring frame having a maximum stressed portion located a maximum distance from the neutral point, the maximum distance being in a range from 5 mm to 15 mm.

6. The opto-electronic package of claim 1, wherein the ring frame encompasses a neutral point of the opto-electronic package, the ring frame having a maximum stressed portion located a maximum distance from the neutral point, the maximum distance being in a range from 15 mm to 25 mm, wherein the first coefficient of thermal expansion and the second coefficient of thermal expansion differ in a range from 2 ppm to 15 ppm, and wherein the first hermetic seal is formed with a soft solder connecting the first bonding pattern to the second bonding pattern.

7. The opto-electronic package of claim 6, wherein the second hermetic seal is formed with a soft solder connecting the third bonding pattern to the fourth bonding pattern.

8. The opto-electronic package of claim 1, wherein the ring frame encompasses a neutral point of the opto-electronic package, the ring frame having a maximum stressed portion located a maximum distance from the neutral point, the maximum distance being in a range from 25 mm to 50 mm, wherein the first coefficient of thermal expansion and the second coefficient of thermal expansion differing in a range from 2 ppm to 10 ppm, and wherein the first hermetic seal is formed with a soft solder connecting the first bonding pattern to the second bonding pattern.

9. The opto-electronic package of claim 8, wherein the second hermetic seal is formed with a soft solder connecting the third bonding pattern to the fourth bonding pattern.

10. A method, comprising:
    providing an opto-electronic circuit on a first surface of a substrate of a lower package assembly, the first surface of the substrate having a first bonding pattern configured to provide a hermetic seal;
    positioning a bottom of a ring frame onto the first bonding pattern so as to surround the opto-electronic circuit with the ring frame, wherein the ring frame encompasses the opto-electronic circuit;
    hermetically sealing a bottom of the ring frame to the first bonding pattern of the first surface of the substrate of the lower package assembly subsequent to the formation of the opto-electronic circuit on the first surface of the substrate; and
    hermetically sealing a top of the ring frame to form a hermetically sealed opto-electronic package,
    wherein the bottom of the ring frame has a second bonding pattern, and wherein soft soldering the bottom of the ring frame to the first bonding pattern further comprises soft soldering the second bonding pattern of the bottom of the ring frame to the first bonding pattern, each of the first and second bonding patterns encompassing the opto-electronic circuit.

11. The method of claim 10, wherein forming the opto-electronic circuit includes incorporating a laser into the opto-electronic circuit, and wherein the step of positioning the bottom of the ring frame includes aligning an optical port within the ring frame with the laser.

12. The method of claim 10, wherein forming the opto-electronic circuit includes incorporating a photodiode into the opto-electronic circuit, and wherein the step of positioning the bottom of the ring frame includes aligning an optical port within the ring frame with the photodiode.

13. The method of claim 10, wherein hermetically sealing the bottom of the ring frame to the first bonding pattern further comprises soft soldering the bottom of the ring frame to the first bonding pattern.

14. The method of claim 10, wherein hermetically sealing a top of the ring frame further comprises soft soldering the top of the ring frame to a lid.

15. The method of claim 14, wherein the top of the ring frame has a third bonding pattern and the lid has a fourth bonding pattern, and wherein soft soldering the top of the ring frame to the lid comprises soft soldering the third bonding pattern to the fourth bonding pattern.

16. The method of claim 10, wherein the substrate of the lower package assembly is constructed of a first material having a first coefficient of thermal expansion, the first coefficient of thermal expansion being indicative of an extent to which the first material expands upon heating, and wherein the ring frame is constructed of a second material having a second coefficient of thermal expansion, the second coefficient of thermal expansion being indicative of an extent to which the second material expands upon heating, the first coefficient of thermal expansion and the second coefficient of thermal expansion differing in a range from 2 ppm to 30 ppm.

17. The method of claim 16, wherein the ring frame encompasses a neutral point of the opto-electronic package, the ring frame having a maximum stressed portion located a maximum distance from the neutral point, the maximum distance being in a range from 15 mm to 25 mm, wherein the first coefficient of thermal expansion and the second coefficient of thermal expansion differ in a range from 2 ppm to 15 ppm, and wherein hermetically sealing the bottom of the ring frame to the first bonding pattern of the first surface of the substrate of the lower package assembly the ring frame is hermetically sealed using a soft solder.

18. The method of claim 16, wherein the ring frame encompasses a neutral point of the opto-electronic package, the ring frame having a maximum stressed portion located a maximum distance from the neutral point, the maximum distance being in a range from 25 mm to 50 mm, wherein the first coefficient of thermal expansion and the second coefficient of thermal expansion differing in a range from 2 ppm to 10 ppm, and wherein hermetically sealing the bottom of the ring frame to the first bonding pattern of the first surface of the substrate of the lower package assembly the ring frame is hermetically sealed using a soft solder.

19. The method of claim 10, wherein the ring frame encompasses a neutral point of the opto-electronic package, the ring frame having a maximum stressed portion located a maximum distance from the neutral point, the maximum distance being in a range from 5 mm to 15 mm.

20. The opto-electronic package of claim 1, wherein the opto-electronic circuit includes transmitter and receiver circuitry.

* * * * *